United States Patent [19]

Dozsa et al.

[11] Patent Number: 4,744,963

[45] Date of Patent: May 17, 1988

[54] HIGHLY EFFICIENT CALCINATION OF GYPSUM TO HEMIHYDRATE

[75] Inventors: Otto L. Dozsa, Palos Heights; Donald R. Janninck, Bloomingdale; Richard F. Stone, Buffalo Grove; Larbi Bounini, Libertyville, all of Ill.

[73] Assignee: United States Gypsum Company, Chicago, Ill.

[21] Appl. No.: 896,373

[22] Filed: Aug. 14, 1986

[51] Int. Cl.$^4$ ............................................. C04B 11/02
[52] U.S. Cl. ................................ 423/171; 423/555; 106/109; 165/104.16; 165/104.23
[58] Field of Search ............... 423/170, 171, 172, 555; 165/104.16, 104.23; 106/109

[56] References Cited

U.S. PATENT DOCUMENTS

| | | | |
|---|---|---|---|
| 1,857,799 | 5/1932 | Winkler | 423/DIG. 16 |
| 2,934,328 | 4/1960 | Zvejnieks | 423/171 |
| 2,968,683 | 1/1961 | Kossmann | 422/199 |
| 3,236,509 | 2/1966 | Blair | 263/21 |
| 3,312,524 | 4/1967 | McAdie | 423/171 |
| 3,314,767 | 4/1967 | Bernstein | 422/199 |
| 3,479,143 | 11/1969 | Kelsall | 422/199 |
| 3,648,994 | 3/1972 | Remmers et al. | 423/555 |
| 4,113,836 | 9/1978 | O'Connor | 423/172 |
| 4,176,157 | 11/1979 | George et al. | 422/114 |
| 4,432,954 | 2/1984 | Quante | 423/171 |
| 4,455,285 | 6/1984 | Watkins et al. | 423/171 |
| 4,594,967 | 6/1986 | Wolowodiuk | 165/104.16 |

FOREIGN PATENT DOCUMENTS 941331  11/1963  United Kingdom ............... 422/199

*Primary Examiner*—Helen M. S. Sneed
*Assistant Examiner*—Anthony McFarlane
*Attorney, Agent, or Firm*—Robert M. Didrick; Robert H. Robinson

[57] ABSTRACT

Hydrodynamic pumping of the fluidized calcining mass in a kettle is set up by the continuous flow of the mass to and from heating rods immersed therein which are constantly emitting at least about 1 British Thermal Unit of heat per minute per square inch of the surface of the rods. The transfer of heat from the walls and bottom of the kettle is enhanced so that more of the available heat is actually absorbed than in a kettle lacking such heating rods. The rate of calcination may be increased while the rate of heat input is decreased.

2 Claims, 2 Drawing Sheets

HIGHLY EFFICIENT CALCINATION OF GYPSUM TO HEMIHYDRATE

This invention relates to an improved method and apparatus for the calcination of gypsum without the formation of insoluble anhydrite. A significant portion of the heat used to effect the calcination by this invention is derived from a heating element in which the heat is intensely and constantly concentrated throughout its length. The normal boiling action of the calcination mass is intensified by the concentrated heat generated in its midst and the vigorous movement of the mass amplifies the heat transfer from the walls of the calcination kettle.

More highly efficient methods for the calcination of gypsum have been the object of inventive activity throughout much of this century. A major portion of this activity has been focused on ways to utilize the expended energy more efficiently. In U.S. Pat. No. 4,176,157, for instance, George, et al teaches introduction of hot combustion gases directly into the mass of gypsum which is also being heated indirectly by contact with the externally heated walls.

In U.S. Pat. No. 3,236,509, a calcining kettle is shown in two versions. In one version, a conventional heating chamber which surrounds the exterior of the kettle is used and the heat is transferred to the calcination mixture conduction through the kettle walls and through flues passing through the kettle chamber. Since the rate of conduction through the kettle is somewhat limited, a considerable amount of heat is lost in the discharged stack gases. A second version is shown in which the combustion gases are directly introduced into the chamber of the kettle and directly discharged into the reaction mixture. A good deal of the heat is still wasted, however, when the stack gases are discharged into the atmosphere at an elevated temperature. In both versions, the calcined gypsum is forced up through a stand pipe from the bottom of the kettle by the differential head between the top of the mass and the stand pipe outlet. The patent teaches an electrical heating element having a power output of about 800 watts within the stand pipe to help maintain the flow of stream and calcined material through the pipe. The size of the heating element is not taught, other than saying it need only be relatively small, and thus the watt density cannot be known but the function of the heating element would require only a small amount of heat output per unit area.

British Patent Specification No. 941,331 teaches the use of heated rollers for calcining materials. The material is dropped onto the first of a series of rollers mounted one above another where it is heated to a desired temperature as the roller rotates to a position where the material is dropped onto a counter-rotating roller and so on until the material is heated to the desired temperature. The patent teaches that the rollers may be heated electrically or by circulating a fluid such as water, steam or oil through them. The serial heating and the equation of electrical heating elements with hot water and steam indicate that the heat output per unit area of the rollers is rather small.

Thus, for the most part, the prior art has been concerned with a more thorough distribution of hot combustion product gas within the calcining mass so that more of the heat content of the gas is made available for absorption by the calcining mass before the gas escapes from the system through an exhaust stack. There still remains a need for a method whereby more of the heat so made available is actually absorbed by the solids, steam and air which constitute the calcining mass.

It is a principal object of this invention, therefore, to provide a highly energy efficient method for the continuous calcination of gypsum.

It is a related object of this invention to provide a method for the continuous calcination of gypsum wherein the rate of calcination is increased while the rate of heat input is decreased.

It is another related object of this invention to provide a method for the continuous calcination of gypsum in a kettle wherein the transfer of heat from the kettle walls to the calcining mixture is enhanced by an intensified boiling action in the mixture which is generated by intense localized internal heating of the mixture.

It is a further object of this invention to provide a method for the continuous calcination of gypsum whereby the hemihydrate produced is essentially free of insoluble anhydrite despite intense localized heating and essentially free of dihydrate despite a very high rate of calcination.

It is a further object of this invention of this invention to provide an apparatus with which the method of this invention is accomplished.

These and other objects of the invention which will become apparent are achieved by the method and apparatus which are described below with reference to the drawings.

The method of this invention comprises charging gypsum into a calcining kettle, heating the kettle and causing the gypsum to become a boiling, calcining mass of solids and gases by conduction of heat from the kettle, and intensifying the boiling action of the mass by contacting it with a heating element immersed therein which is emitting at least about 1, preferably from about 1 to about 2.9, British Thermal Units of heat per minute per square inch of the element's surface, thereby enhancing the conduction of heat from the kettle.

BRIEF DESCRIPTION OF THE DRAWINGS

In FIG. 1, the kettle 10 has the cylindrical wall 12, the convex bottom wall 14, and the cover 16 through which the steam vent 18, the stirrer shaft 20, the weir gate 21, and the gypsum feed inlet 22 pass. Access to the kettle interior is provided by the manhole 23 shown in FIG. 3. The kettle 10 rests within and is supported by the combustion chamber 24 in which the burner 26 supplies heat to the kettle and its contents in the conventional manner. Gases from the combustion of fuel pass around the kettle and out of the stack 28. Connected to the shaft 20 are the sweeps 30 and the drag 32, to which the drag chain 33 is attached. The baffle 34 blocks passage of fresh gypsum through the exit port 36 but allows the calcined gypsum to pass through the discharge conduit 38 and into the hot pit 40, only a fragment of which is shown. Fluidizing air is directed between the baffle 34 and the wall 12 by the pipe 41. The clean out port 42 also is connected to the pit 40 but it is closed during calcination by the plug 44. The kettle 10 may be modified by the installation of cross flues as described in U.S.

Pat. No. 3,236,509, which is incorporated herein by reference. The heat available from such flues has been calculated to range from about 0.2 to about 0.3 British Thermal Units per minute per square inch.

Figure 1:
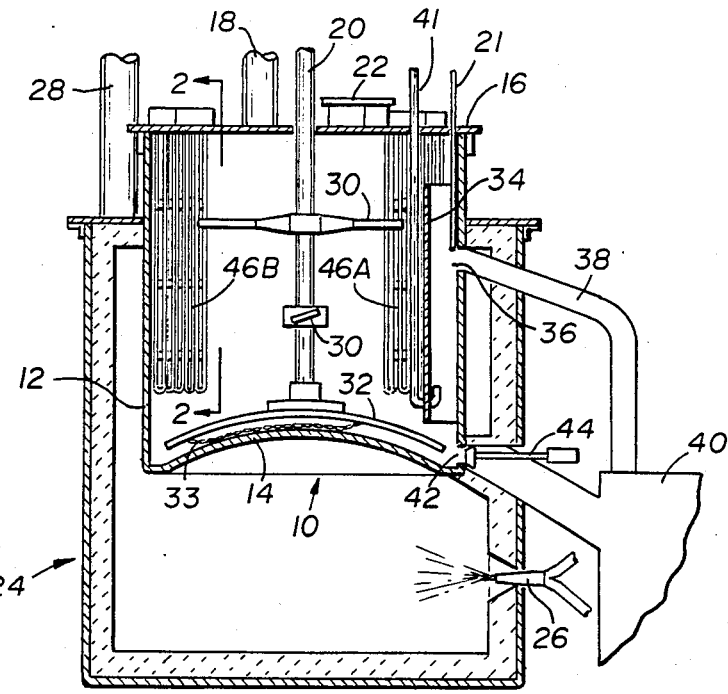
FIG. 1 is a cross section of a conventional calcining kettle modified in accordance with this invention.
Figure 2:
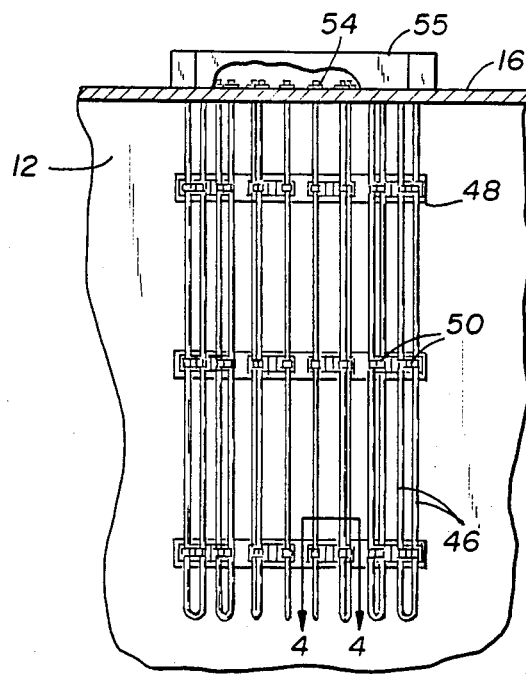
FIG. 2 is a fragmentary sectional view of the kettle of FIG. 1 taken along the line 2—2 of FIG. 1
Figure 3:
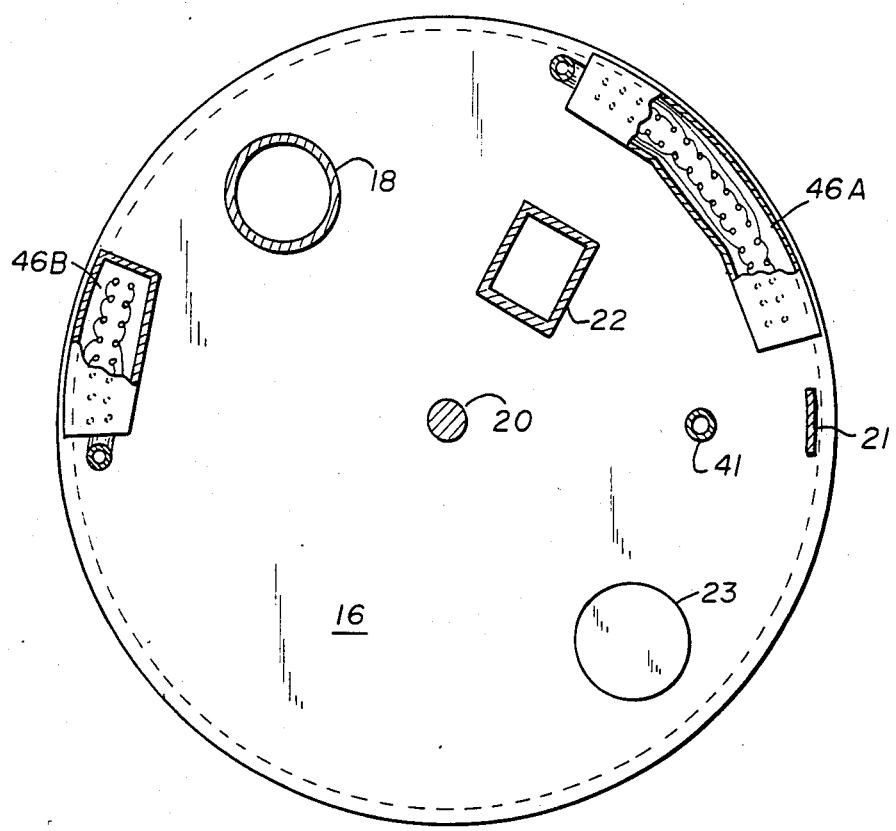
FIG. 3 is a plan view of the kettle of FIG. 1.
Figure 4:
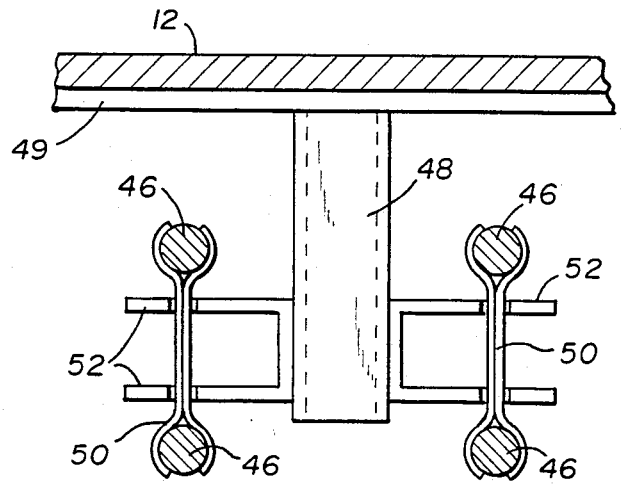
FIG. 4 is a sectional view of the kettle of FIG. 1 as taken along line 4—4 in FIG. 2.

The U-shaped vertical heating rods 46A and 46B (see FIG. 3) are installed in the kettle 10 (as shown in FIG. 4) by welding the supports 48 to the plate 49 which in turn is welded to the wall 12 and inserting the rods into the clamps 50 which are disposed bilaterally on the distal portion of the brackets 52 which extend from the supports 48. Each leg of a heating rod 46 has a terminal pin 54 which is connected to a high voltage electrical supply line at the junction box 55 (as shown in FIG. 2). The maximum watt density of a rod 46 may be about 17 or more watts per square inch of surface area but it is preferably from about 30 to about 50 and, even more preferably, from about 35 to about 40 watts per square inch.

The rods may be round or oval in cross section, their major diameter being from about 0.4 to about 0.6 inch. They may be spaced apart around the entire inner periphery of the wall 12 or spotted individually or in groups at selected locations along said walls. Spacing of the rods when grouped is preferably about 3 to 4 inches on center. The minimum clearance between the rods 46 and the sweeps is about 1.5 inches and the distance between the wall 12 and the rods may be from about 1.5 to about 6 inches. If the sweeps are not present, the rods 46 may be moved further inward. A rod 46 may be comprised of an Incoloy 800 sheathing, a Nichrome 80-20 wire surrounded by the sheathing, and magnesium oxide as an insulator between the wire and the sheathing.

The objectives of this invention may also be achieved by wrapping electrical heating tapes around the sweeps 30 and/or around one or more transverse bars fastened at each end to the wall 12 of the kettle.

The use of heating rods in kettles that are heated by the combustion of a fuel is advantageous even when the cost of electricity would prohibit their use as the sole source of heat. In the method of this invention, from about 5% to about 15% of the total heat input is supplied by the electrical heating elements. The vigorous boiling action imparted to the calcining mass by the constant intense heat from the rods 46 enhances the transfer of heat from the walls and cross flues of the kettle as will be shown in the following examples. Thus, the overall efficiency of heat utilization is greater than it would be if the same amount of heat were supplied solely by the combustion of fuel gas. Fluidization of the mass is so thorough that only minimal agitation by the sweeps 30 is necessary. A hydrodynamic pumping action set up by the continuous movement toward and away from the immersed heating rods by successive portions of the calcining mass keeps the mass flowing past the hottest part of a kettle, the bottom wall, which often emits on the order of about 6 British Thermal Units of heat per minute per square inch. This pumping action up and around the immersed heating rods is in contrast to the erratic bumping and sputtering of the calcining mass which gravitates to the bottom wall in a conventional kettle.

The more efficient utilization of heat in the calcination of gypsum when a portion of the heat is supplied by electrical heating elements such as the rods 46 is demonstrated by the results of the following examples, as shown in Tables I, II, and III.

EXAMPLE 1

A small (18 inch diameter, 14 inches high), gas fired kettle similar to the kettle 10 was modified by suspending two heating coils (watt density of 24 watts/sq. in.; power rating of 675 watts) from its cover. After a 1.36 hour, gas fired heat-up period, continuous calcination of a finely ground, feed grade Southard landplaster was carried on for 1.23 hours with gas firing only to establish a control. Then the heating coils were turned on and calcination was continued for 1.56 hours while heat was supplied by both sources. Forty minute samples of the calcined product were collected during both the control and the test period. The gas firing rate and the power input to the coils were kept constant and the overflow temperature was maintained in the 290° to 315° F. range by balancing the feed and overflow rate. The overflow rate was controlled by adjusting the fluidizing air pressure. It was noted that, whereas adjustments to either the feed rate or air pressure had to be made eight times during the 40 minute sampling portion of the control period, only five adjustments were necessary during the sampling of the test product in order to maintain the calcination temperature within the prescribed range.

Neither the control sample nor the test sample of stucco contained any insoluble anhydrite or uncalcined gypsum as measured by X-ray diffraction and DTA-TGA tests.

TABLE I

| Parameter | Unit* | Control Period | Test Period |
|---|---|---|---|
| Power Input by Electric Coils | kw/coil | — | 0.495 |
| Heat Input by Gas during Sampling | Btu | 20660 | 20660 |
| Heat Input by Coils during Sampling | Btu | — | 2252 |
| Av. Calcination Rate during Sampling | lb/hr | 43.4 | 66.7 |
| Specific Btu Usage during Sampling | Btu/ton of landplaster | 1,428,110 | 1,030,524 |
| Av. Overflow Temp. during Sampling | °F. | 304 | 308 |
| Theoretical Heat of Calcination (ΔH)** | Btu/ton of landplaster | 416656 | 416459 |
| Calcination Efficiency during Sampling | % | 29.2 | 40.4 |

*1 Btu = 1.05 × $10^3$ joule
1 Btu/lb = 2.3 × $10^3$ joules/kg
1 lb/hr = 0.45 kg/hr
°C. = 0.56 (°F. - 32)
**ΔH, at temperature T (°K.) = $H_0$ + 0.82T - 0.006$T^2$ where $H_0$ = 20640 calories The increased reactivity of the stucco collected during the test period of Example I, as shown by the results of the standard Temperature Rise Set Test in Table II below, may be due to its greater surface area.

TABLE II

| Parameter | Unit | Stucco from Test Period | Stucco from Control Period |
|---|---|---|---|
| Blaine Surface Area | cm²/g | 3783.00 | 3445.00 |
| Water to Stucco Ratio | — | 0.85 | 0.85 |
| Initial Slurry Temp. | °F. | 84.70 | 84.50 |
| Max. Rate of Rise | °F. | 4.80 | 4.32 |
| Final Set Time | Min | 28.00 | 31.50 |
| Total Temp. Rise | °F. | 30.40 | 29.70 |

EXAMPLES 2-4

Continuous calcination of gypsum was conducted in a high volume production-sized kettle similar to the kettle 10 except that it had cross flues carrying hot gases from the combustion chamber, as in U.S. Pat. No. 3,236,509. The rods 46A and 46B were mounted in groups of eight and sixteen, respectively, to make a total of twenty four. To establish a control, only heat from the combustion of fuel gas was utilized for about 6.5 hours. The parameters of the control period and examples of this invention are given in Table III. Again, neither the stucco from the control period nor that from these working examples contained any insoluble anhydrite or dihydrate.

TABLE III

| Parameter | Unit* | Control Period | Example 2 | Example 3 | Example 4 |
| --- | --- | --- | --- | --- | --- |
| Time | hrs. | 6.5 | 3.3 | 4.25 | 7.1 |
| Gas Flow | SCFH | 8881 | 7875 | 6835 | 9138 |
| Heat Input By Gas | Btu/hr | 9,174,073 | 8,134,875 | 7,060,555 | 9,439,554 |
| Heat Input By Rods 46 | Btu/hr | — | 511,950 | 1,044,378 | 1,044,378 |
|  | Btu/min./sq. in. | — | 1.1 | 2.3 | 2.3 |
| Heat Input By Electricity | % | — | 5.92 | 12.89 | 9.96 |
| Production Rate | Ton**/hr | 10.61 | 12.11 | 11.20 | 14.63 |
| Specific BTU Consumption | $\frac{Btu \times 10^6}{ton^{**}}$ | 0.864663 | 0.714024 | 0.723655 | 0.716605 |
| Calcination Efficiency | % | 62.85 | 76.11 | 75.10 | 75.83 |
| Temp. of Rods |  |  |  |  |  |
| 46A | °F. | — | 355–360 | 415–420 | 400–415 |
| 46B | °F. | — | 395–400 | 500–510 | 485–495 |
| Stack Off-Gas Temp. | °F. | 620 | 580 | 560 | 630 |
| Firebox Temp. | °F. | 2025 | 1960 | 1850 | 2040 |

*1 CFH = 7.9 × 10$^{-6}$ m$^3$/s
1 Btu/hr = 1.05 × 10$^3$ J/hr.
1 Btu/min/sq. in. = 1.3 w/m$^2$
**Metric ton, 2200 pounds, 1000 kg stucco As thus shown in Table III, the total hourly heat input in Examples 2 and 3 was less than that in the Control Period but, surprisingly, the rate of production of stucco was greater in each of those two examples. The constant intense heat generated throughout the length of the rods 46 as compared to the diminishing heat content of the combustion product gas as it travels through the cross flues from a remote source is responsible for creating an intensified boiling action in the calcining mass which increases the number of collisions between the particles of solids and gases and the walls and flues of the kettle so that more heat is absorbed from the kettle by the calcining mass and less heat is lost with the stack gas, as shown by the stack gas temperatures during the control period and in Example 4, wherein the greater heat input by the gas, alone, might be expected to cause a larger increase in the stack gas temperature.

The subject matter claimed is:

1. A method for calcining gypsum which comprises charging the gypsum into a calcining kettle, heating the kettle and causing the gypsum to become a boiling, calcining mass of solids and gases by conduction of heat from the kettle, and intensifying the boiling action of the mass by contacting the calcining mass with a heating element immersed therein which is constantly emitting at least about 1 British Thermal Unit per minute from each square inch of the element's surface, thereby enhancing the conduction of heat from the kettle by the calcining mass.

2. The method of claim 1 wherein from about 1 to about 2.9 British Thermal Units are emitted per minute from each square inch of the heating element's surface.

* * * * *

UNITED STATES PATENT AND TRADEMARK OFFICE
CERTIFICATE OF CORRECTION

PATENT NO. : 4,744,963

DATED : May 17, 1988

INVENTOR(S) : Otto L. Dozsa, Donald R. Janninck, Richard F. Stone, Larbi Bounini It is certified that error appears in the above—identified patent and that said Letters Patent is hereby corrected as shown below:

Column 1, line 29, after mixture add the word --by--.

Column 1, line 44, change "stream" to --steam--.

Column 2, line 23, delete the phrase "of this invention". (2nd occurrence)

Signed and Sealed this

Eighteenth Day of October, 1988

Attest:

DONALD J. QUIGG

Attesting Officer    Commissioner of Patents and Trademarks